US012716427B2

(12) United States Patent
Sommer et al.

(10) Patent No.: US 12,716,427 B2
(45) **Date of Patent: *Aug. 25, 2026**

(54) VARIABLE GEOMETRY DIFFUSER HAVING EXTENDED TRAVEL AND CONTROL METHOD THEREOF

(71) Applicant: Tyco Fire & Security GmbH, Neuhausen am Rheinfall (CH)

(72) Inventors: Steven T. Sommer, York, PA (US); Jeb W. Schreiber, Emigsville, PA (US); Justin P. Kauffman, York, PA (US); Kurt F. Nenstiel, York, PA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 76 days.

This patent is subject to a terminal disclaimer.

(21) Appl. No.: 17/399,956

(22) Filed: Aug. 11, 2021

(65) Prior Publication Data

US 2021/0372433 A1 Dec. 2, 2021

Related U.S. Application Data

(63) Continuation of application No. 16/510,622, filed on Jul. 12, 2019, now Pat. No. 11,092,166, which is a (Continued)

(51) Int. Cl.

*F04D 29/46* (2006.01)
*F04D 27/02* (2006.01)
*F04D 29/058* (2006.01)

(52) U.S. Cl.

CPC ....... *F04D 29/464* (2013.01); *F04D 27/0246* (2013.01); *F04D 27/0253* (2013.01); *F04D 29/058* (2013.01); *F05D 2250/52* (2013.01)

(58) Field of Classification Search

CPC .... F04D 29/464; F04D 29/058; F04D 29/441; F04D 29/442; F04D 27/0246;

(Continued)

(56) References Cited

U.S. PATENT DOCUMENTS

| | | |
|---|---|---|
| 2,996,996 A | 8/1961 | Jassniker |
| 3,032,259 A | 5/1962 | Jassniker |

(Continued)

FOREIGN PATENT DOCUMENTS

| | | | |
|---|---|---|---|
| CN | 1213045 A | 4/1999 | |
| CN | 115380165 A | * 11/2022 | ......... F04D 27/0253 |

(Continued)

OTHER PUBLICATIONS

Ishino et al. JP 2012184706_English Machine Translation_ Espacenet (Year: 2012).*

*Primary Examiner* — Nathaniel E Wiehe
*Assistant Examiner* — Wayne A Lambert
(74) *Attorney, Agent, or Firm* — Fletcher Yoder, P.C.

(57) ABSTRACT

An improved variable geometry diffuser (VGD) mechanism for use with a centrifugal compressor. This VGD mechanism extends substantially completely into the diffuser gap so that the VGD mechanism may be used more fully to control other operational functions. The VGD mechanism may be used to minimize compressor backspin and associated transient loads during compressor shut down by preventing a reverse flow of refrigerant gas through the diffuser gap during compressor shutdown, which is prevented because the diffuser gap is substantially blocked by the full extension of the diffuser ring. During start-up, transient surge and stall also can be effectively eliminated as gas flow through the diffuser gap can be impeded as load and impeller speed increase, thereby alleviating the problems caused by startup loads at low speeds. The VGD mechanism can be used for (Continued)

capacity control as well so as to achieve more effective turndown at low loads.

20 Claims, 9 Drawing Sheets

Related U.S. Application Data continuation of application No. 14/368,330, filed as application No. PCT/US2013/068279 on Nov. 4, 2013, now Pat. No. 10,378,553.

(60) Provisional application No. 61/724,684, filed on Nov. 9, 2012.

(58) Field of Classification Search
CPC .. F04D 27/0253; F04D 27/002; F04D 27/008; F05D 2250/52
See application file for complete search history.

(56) References Cited

U.S. PATENT DOCUMENTS

| | | | | | |
|---|---|---|---|---|---|
| 3,228,656 | A | | 1/1966 | Kyogoku | |
| 3,236,500 | A | | 2/1966 | Kofink | |
| 3,362,624 | A | * | 1/1968 | Endress | F04D 29/464 415/150 |
| 3,365,120 | A | | 1/1968 | Jassniker | |
| 3,478,955 | A | | 11/1969 | Kunderman | |
| 3,619,078 | A | | 11/1971 | Mount et al. | |
| 3,784,318 | A | | 1/1974 | Davis | |
| 3,826,586 | A | | 7/1974 | Richards | |
| 3,941,498 | A | | 3/1976 | Duckworth et al. | |
| 3,992,128 | A | | 11/1976 | Lunsford et al. | |
| 4,056,330 | A | | 11/1977 | Lieber | |
| 4,219,305 | A | | 8/1980 | Mount et al. | |
| 4,265,589 | A | | 5/1981 | Watson et al. | |
| 4,265,592 | A | | 5/1981 | Carlini | |
| 4,378,194 | A | | 3/1983 | Bandukwalla | |
| 4,416,583 | A | | 11/1983 | Byrns | |
| 4,460,310 | A | | 7/1984 | Plunkett | |
| 4,581,900 | A | | 4/1986 | Lowe et al. | |
| 4,608,833 | A | | 9/1986 | Kountz | |
| 4,611,969 | A | * | 9/1986 | Zinsmeyer | F04D 29/464 415/14 |
| 4,643,639 | A | * | 2/1987 | Caine | F04D 29/468 277/412 |
| 4,718,819 | A | | 1/1988 | Rogo et al. | |
| 4,802,817 | A | | 2/1989 | Tyler | |
| 4,932,835 | A | | 6/1990 | Sorokes | |
| 4,969,798 | A | * | 11/1990 | Sakai | F04D 29/4213 415/48 |
| 5,059,091 | A | | 10/1991 | Hatfield | |
| 5,116,197 | A | * | 5/1992 | Snell | F04D 29/464 415/126 |
| 5,452,986 | A | | 9/1995 | Osborne et al. | |
| 5,669,756 | A | | 9/1997 | Brasz et al. | |
| 5,941,684 | A | | 8/1999 | Parker | |
| 5,971,704 | A | * | 10/1999 | Blattmann | F04D 29/167 415/173.2 |
| 6,139,262 | A | | 10/2000 | Ravidranath | |
| 6,158,956 | A | | 12/2000 | Arnold | |
| 6,168,375 | B1 | * | 1/2001 | LaRue | F04D 25/04 415/146 |
| 6,857,845 | B2 | | 2/2005 | Stabley et al. | |
| 6,872,050 | B2 | | 3/2005 | Nenstiel | |
| 7,356,999 | B2 | | 4/2008 | Bodell, II et al. | |
| 7,905,102 | B2 | | 3/2011 | Bodell, II et al. | |
| 7,905,702 | B2 | | 3/2011 | Stabley et al. | |
| 8,118,543 | B2 | * | 2/2012 | Umeyama | F04D 29/464 415/206 |
| 8,764,388 | B2 | | 7/2014 | Roberts et al. | |
| 9,874,226 | B2 | * | 1/2018 | Fukuyama | F04D 27/0253 |
| 10,302,097 | B2 | * | 5/2019 | Jiang | F04D 29/4206 |
| 2002/0014088 | A1 | | 2/2002 | Seki et al. | |
| 2004/0109757 | A1 | | 6/2004 | Nenstiel | |
| 2008/0115527 | A1 | | 5/2008 | Doty et al. | |
| 2011/0048046 | A1 | | 3/2011 | Sommer et al. | |
| 2011/0141815 | A1 | | 6/2011 | Haratsch et al. | |
| 2011/0318182 | A1 | | 12/2011 | Jeong et al. | |
| 2012/0230817 | A1 | * | 9/2012 | Iwata | F04D 29/462 415/206 |
| 2013/0064682 | A1 | * | 3/2013 | Sun | F04D 15/00 417/18 |
| 2014/0003930 | A1 | * | 1/2014 | Shioda | F04D 27/0246 415/203 |
| 2015/0010383 | A1 | * | 1/2015 | Sun | F04D 29/462 415/13 |

FOREIGN PATENT DOCUMENTS

| | | | | | |
|---|---|---|---|---|---|
| DE | 102006009354 | A1 | * | 9/2007 | F04D 29/464 |
| DE | 102008051980 | A1 | | 2/2010 | |
| EP | 0046173 | B1 | * | 4/1984 | F01D 17/143 |
| GB | 285815 | A | * | 5/1928 | F04D 29/464 |
| GB | 2427446 | A | * | 12/2006 | F01D 17/143 |
| JP | 49-501 | | | 1/1974 | |
| JP | S49-97113 | A | | 9/1974 | |
| JP | S57-88297 | A | | 6/1982 | |
| JP | S58-37993 | U | | 3/1983 | |
| JP | S58-124099 | A | | 7/1983 | |
| JP | H0663897 | U | * | 9/1994 | |
| JP | H078597 | U | * | 2/1995 | F04D 29/464 |
| JP | H07-63186 | A | | 3/1995 | |
| JP | 2001173590 | A | | 6/2001 | |
| JP | 2002-147386 | A | | 5/2002 | |
| JP | 2005535834 | A | | 11/2005 | |
| JP | 2006509155 | A | | 3/2006 | |
| JP | 2007509268 | A | | 4/2007 | |
| JP | 2007-211716 | A | | 8/2007 | |
| JP | 2009185816 | A | | 8/2009 | |
| JP | 2010-031876 | A | | 2/2010 | |
| JP | 2010-261464 | A | | 11/2010 | |
| JP | 2011502227 | A | | 1/2011 | |
| JP | 2012184706 | A | * | 9/2012 | |
| KR | 20050085407 | A | | 8/2005 | |
| KR | 20070086798 | A | | 8/2007 | |
| KR | 20100100241 | A | | 9/2010 | |
| KR | 20120014080 | A | | 2/2012 | |

* cited by examiner

VARIABLE GEOMETRY DIFFUSER HAVING EXTENDED TRAVEL AND CONTROL METHOD THEREOF

CROSS-REFERENCE TO RELATED APPLICATIONS

This application is a continuation of U.S. patent application Ser. No. 16/510,622, entitled "VARIABLE GEOMETRY DIFFUSER HAVING EXTENDED TRAVEL AND CONTROL METHOD THEREOF," filed Jul. 12, 2019, which is a continuation of U.S. patent application Ser. No. 14/368,330, entitled "VARIABLE GEOMETRY DIFFUSER HAVING EXTENDED TRAVEL AND CONTROL METHOD THEREOF," filed Jun. 24, 2014, which is a National Stage of PCT Application Serial No. PCT/US2013/068279, entitled "VARIABLE GEOMETRY DIFFUSER HAVING EXTENDED TRAVEL AND CONTROL METHOD THEREOF," filed Nov. 4, 2013, which claims priority from and benefit of U.S. Provisional Application Ser. No. 61/724,684, entitled "VARIABLE GEOMETRY DIFFUSER HAVING EXTENDED TRAVEL," filed Nov. 9, 2012, each of which is hereby incorporated by reference in its entirety for all purposes.

FIELD OF THE INVENTION

The present invention is directed to centrifugal compressors, and more particularly to an improved variable geometry diffuser mechanism allowing improved control over the complete operating range of a centrifugal compressor including startup and shutdown.

BACKGROUND OF THE INVENTION

Centrifugal compressors are useful in a variety of devices that require a fluid to be compressed, such as chillers. The compressors operate by passing the fluid over a rotating impeller. The impeller works on the fluid to increase the pressure of the fluid. Because the operation of the impeller creates an adverse pressure gradient in the flow, some compressor designs include a variable geometry diffuser positioned at the impeller exit to stabilize the fluid flow during stall events, thereby mitigating stall. Stall results as refrigerant flow decreases while the pressure differential across the impeller is maintained. Stall undesirably creates noise, causes vibration and reduces compressor efficiency.

Since stall conditions are present only a very small percentage of the time that the compressor operates, the operation of the variable geometry diffuser similarly has been limited, so that wear and tear, loadings and other functions that affect the overall life integrity of a diffuser mechanism has been limited. However, increasing usage of a variable geometry diffuser mechanism would dramatically affect the overall reliability and life of a diffuser mechanism.

A diffuser design that has been effective is set forth in U.S. Pat. No. 6,872,050 issued on Mar. 29, 2005, to Nenstiel (the '050 Patent). The '050 Patent discloses a variable geometry diffuser that is opened and closed during the operation of the compressor, is inexpensive to manufacture, is easy to assemble, is simple to repair or replace, and provides positive engagement for position determination in response to signals or commands from the controller in response to incipient stall conditions.

The variable geometry diffuser design of the '050 Patent utilizes a diffuser ring movable between a first retracted position in which flow through a diffuser gap is unobstructed and a second extended position in which the diffuser ring extends into the diffuser gap to alter the fluid flow through the diffuser gap in response to detection of stall. This is accomplished by extending the diffuser ring substantially across the diffuser gap to alter fluid flow. This mitigation can be accomplished by extending the diffuser ring across about 75% of the diffuser gap. The diffuser ring is driven by a drive ring movable from a first position corresponding to the first retracted position of the diffuser ring, a second position corresponding to the second extended position of the diffuser ring, and any intermediate position between the first position and the second position. The second position is an extended position that stabilizes the system at about 75% of the diffuser gap so that stall is mitigated. The drive ring in turn is mounted to support blocks, and the drive ring is rotationally movable with respect to the support blocks, which are mounted to the backside of a nozzle base plate. The nozzle base plate is fixed to the housing adjacent the impeller of the centrifugal compressor. While the variable geometry diffuser design is effective during compressor operation in altering flow through the diffuser gap when the diffuser ring is in its second extended position, the diffuser ring does not sufficiently block flow during compressor shutdown to retard compressor backspin and associated transient loads or to avoid transient surge and stall during start-up as the compressor ramps up from low loads and low speeds to high speed.

Use of the variable geometry diffuser generates a load on the diffuser ring due to a pressure differential on the overall ring area. When the ring is in its retracted position, the compressed refrigerant passes over the ring surface and very little load is encountered. However, as the ring moves to its extended position into the diffuser gap, high velocity gas passes over the face of the diffuser ring creating a low pressure area. Higher pressure gas in the groove of the nozzle base plate exerts a force on the back side of the ring. The load on the ring, and the rest of the variable geometry diffuser mechanism, can be calculated. It is the difference in gas pressure on either side of the ring multiplied by the area of the ring. The variable geometry diffuser of the present invention includes a relatively large diffuser ring, the operation of which must overcome substantial forces and which must withstand substantial forces in operation. Thus, the mechanisms are substantial and the energy required to operate these mechanisms to overcome these forces is also substantial. However, because the variable geometry diffuser is engaged for only a small percentage of the overall life of the compressor, the loads and wear and tear experienced by the variable geometry diffuser have been acceptable.

There is a desire to increase the usage of the variable geometry diffuser ring so that it can be used for more than as just a stall mitigation device. The variable geometry diffuser may be used for not only stall mitigation, but also for capacity control, surge control, improved turndown, minimization of compressor backspin and associated transient loads during compressor shut down as well as for minimization of start-up transients. Due to the increased usage of such a variable geometry diffuser, an improved device is required to provide desirable control enhancements to overall centrifugal compressor operation, while providing longevity to the variable geometry diffuser experiencing increased usage.

SUMMARY OF THE INVENTION

The present invention provides a variable geometry diffuser (VGD) mechanism. The VGD mechanism includes a diffuser ring extending into a diffuser gap that mitigates stall, as expected of a VGD mechanism. However, the VGD mechanism of the present invention extends further into the diffuser gap than prior art VGD mechanisms so that the VGD mechanism of the present invention may be used to control other operational functions. Thus the VGD mechanism may be used to minimize compressor backspin and associated transient loads during compressor shut down by preventing a reverse flow of refrigerant gas through the diffuser gap during compressor shutdown. The reverse flow of refrigerant gas is prevented because the diffuser gap is substantially blocked by the full extension of the diffuser ring. The VGD mechanism further provides for better and more efficient compressor turn-down, reducing the need for significant hot gas bypass during low cooling capacity operation. During start-up, transient surge and stall also can be effectively eliminated as the variable geometry diffuser ring can be positioned to impede gas flow through the diffuser gap as load and impeller speed increase, thereby alleviating the problems caused by startup loads at low speeds. The VGD mechanism of the present invention can be used for capacity control as well, so as to achieve more effective turndown at low loads.

While the diffuser ring extends across the diffuser gap to accommodate reduced gas flow through the diffuser gap during normal operation under certain conditions, the diffuser ring must extend substantially completely across the diffuser gap during shut-down and start-up since the gas flow is significantly reduced as the impeller ramps up to speed during start-up or decreases its speed during shut-down. The outer edge of the diffuser ring comprises a flange that, when fully extended across the diffuser gap, substantially impedes gas flow through the diffuser gap. The axial force on the diffuser ring is a function of the pressure differential on either side of the ring and the area of the ring. When the diffuser ring is extended into the diffuser gap, high velocity gas passes over the outer face of the ring creating a low pressure area. Higher pressure gas on a first side of the ring provides a force on the first side of the ring. The overall axial force on the ring is the difference in gas pressure between the first side of the ring and the second, opposite side of the ring multiplied by the radial face area of the ring. The axial force on the ring may be minimized by reducing the area of the ring. By reducing the radial width of the ring extending into the diffuser gap, the axial force on the ring is reduced proportionally to the width of the ring. While the width (thickness) of the ring may be reduced to lower the load, the ring must be sufficiently thick to accommodate the increased radial forces from flow past the ring or it will not act to block gas flow effectively and may be subject to operational failures. The thickness of the ring will vary among compressors depending upon the capacity of the compressor, the thickness of the ring being relative, that relation depending on several factors, the most important being the net radial flow forces acting on the first, inner cylindrical surface and second, outer cylindrical surface of the diffuser ring, particularly as the impeller slows from operational speed during shut-down or ramp-up to operational speed during start-up. Larger compressors with larger impellers will generate higher flow forces and experience higher loads, requiring thicker rings. But, regardless of compressor size, reducing the axial forces on the ring reduces the forces necessary to operate the VGD mechanism.

The resulting axial load on the ring ultimately is transmitted to an actuator mechanism. The actuator mechanism of the present invention includes improvements that allow it to be operated in an oil free environment, although its operation is not so restricted. The actuator mechanism also is modified so that the position of the diffuser ring with respect to the opposed interior face of the housing can be monitored and adjusted by a controller as needed. The associated cam track mechanism also has been modified so that the position of the ring in the diffuser gap can be determined at any time.

Not only must the ring be sufficiently thick to handle the radial loads over the life of the compressor, the ring must also interface with the opposed housing to provide a gap that is uniform around its circumference and must effectively mate with an interior face of the housing that also must be dimensioned to be uniform. If the gap is not substantially uniform, that is, outside of allowable tolerances, pressurized gas will leak through the gap at locations where the gap is larger than allowable, defeating the purpose of the closed diffuser ring without reducing the problems related to capacity control, surge, that occurs during shutdown and start-up, and other operational improvements associated with the improved VGD mechanism. Whereas elimination of such leakage around the diffuser ring during shut down and start-up was not an imperative with prior art designs, to be effective, both the diffuser ring and the opposed interior face of the housing of the present invention must have carefully controlled mating surfaces so that proper operation of the VGD mechanism can be accomplished over a range of conditions.

Thus, in the present invention, in order to affect control of gas flow through the diffuser gap, physical changes extending the travel of the diffuser ring into the diffuser gap are required for the VGD mechanism. In addition to extending the length of the diffuser ring into the diffuser gap to allow substantially full closure of diffuser gap, the radial area of the diffuser ring is reduced to reduce the axial forces on the ring in response to the pressure forces. Also, by inclusion of sensors, a controller can now monitor the position of the diffuser ring accurately and direct the actuator mechanism to accurately move the diffuser ring between positions that are fully open and fully closed in response to compressor operating conditions. Faster-acting mechanisms can be used to achieve better control of the ring position and respond to chiller system transients such as startup with pressure differential across the compressor or power failure shutdowns.

An additional benefit of the improved variable geometry diffuser of this invention is the elimination of the need for pre-rotation vanes for capacity control and startup management. Pre-rotation vanes and their mechanisms are complex, expensive, and require their own drive mechanisms and controls.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
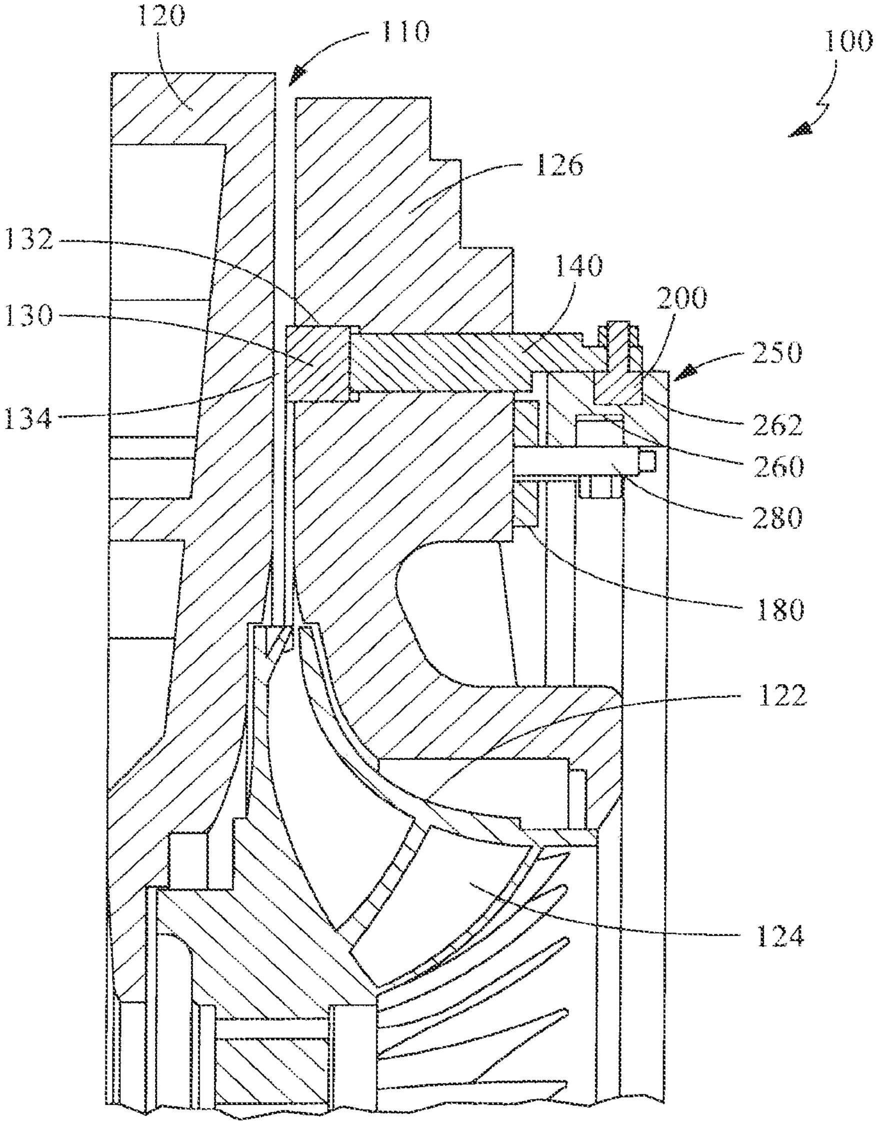
FIG. 1 (Prior Art)
FIG. 1 is a cross-sectional view of a prior art variable geometry diffuser in a centrifugal compressor utilizing a movable diffuser ring.

The present invention sets forth an improved VGD mechanism for a centrifugal compressor. FIG. 1 depicts generally, in cross-section, a prior art variable capacity centrifugal compressor 100 utilizing a VGD mechanism having a movable diffuser ring 130 to control the flow of fluid through a diffuser gap 134 such as disclosed in U.S. Pat. No. 6,872,050, assigned to the assignee of the present invention and incorporated herein in its entirety by reference. FIG. 1 generally represents current state-of-the-art variable capacity centrifugal compressors.

As illustrated in FIG. 1, compressor 100 includes diffuser plate 120 which, as shown, is integral with the compressor housing, an impeller 122, and a nozzle base plate 126. A diffuser ring 130, part of the variable geometry diffuser 110, is assembled into a groove 132 machined into nozzle base plate 126 and mounted onto a drive pin 140. Also shown in the FIG. 1 cross section is a cam follower 200 that is inserted into cam track 262 which is located in drive ring 250. Cam follower 200 is connected to drive pin 140. These mechanisms, as is fully discussed in the '050 patent, transform rotational movement of drive ring 250 into axial movement of diffuser ring 130. Inner circumferential groove 260 supports an axial bearing 280, which resists axial movement of drive ring 250 as it rotates. As shown in the illustrated embodiment of FIG. 1, the axial bearing 280 is supported by a bearing block 180.

Diffuser ring 130 is movable away from groove 132 and into diffuser gap 134 that separates diffuser plate 120 and nozzle base plate 126. Refrigerant passes through diffuser gap 134, which is intermediate between impeller 122 and volute (not shown) that receives refrigerant exiting diffuser 110. Refrigerant may pass through the volute to an additional stage of compression or to a condenser (also not shown). In the completely retracted position, diffuser ring 130 is nested in groove 132 in nozzle base plate 126 and a diffuser gap 134 is in a condition to allow maximum refrigerant flow. In the completely extended position, diffuser ring 130 extends across diffuser gap 134, reducing clearance for refrigerant to pass through diffuser gap 134. Diffuser ring 130 can be moved to any position intermediate the retracted position and the extended position.

The rotation of impeller 122 imparts work to the fluid, typically a refrigerant, entering at the impeller inlet 124, thereby increasing its pressure. As is well-known in the art, refrigerant of higher velocity exits the impeller and passes through diffuser gap 134 as it is directed to a volute and ultimately to the compressor exit. Diffuser 110, comprising diffuser plate 120, nozzle base plate 126 and diffuser gap 134 formed between diffuser plate 120 and nozzle base plate 126, as well as diffuser ring 130 used to adjust diffuser gap 134, reduces the velocity of the refrigerant from impeller 122, thereby increasing the pressure of the refrigerant at the diffuser exit.

Figure 2:
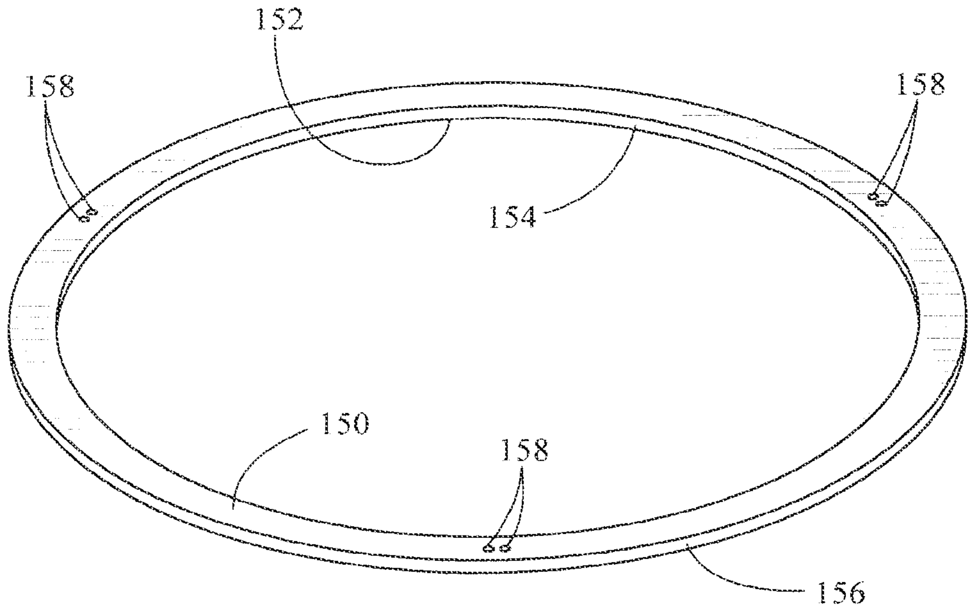
FIG. 2 (Prior Art)
FIG. 2 provides a perspective view of a prior art diffuser ring.

If the compressor flow rate decreases to accommodate, for example, a reduction in cooling demand for a chiller, and the same pressure is maintained across impeller 122, the fluid flow exiting impeller 122 can become unsteady and may flow alternately backward and forward to create the stall and/or surge condition discussed above. In response to a lower refrigerant flow, to prevent a surge condition from developing, the diffuser gap 134 is reduced to decrease the area at the impeller exit and stabilize fluid flow. The diffuser gap 134 can be changed by moving diffuser ring 130 into gap 134 to either decrease the cross-sectional area of gap 134 or increase the cross-sectional area of gap 134 by moving the diffuser ring within groove 132. However, because of the mechanism used to drive diffuser ring 130, the exact position of diffuser ring in gap 134 is not known except at the extreme positions of the diffuser ring, that is, when fully extended or fully retracted. Furthermore, because the geometry of both the diffuser ring and the diffuser plate have not been carefully controlled in the invention of the '050 patent, even when the diffuser ring 130 is fully extended, a gap permitting leakage past the diffuser ring may still exist. The prior art diffuser ring 130 is set forth in FIGS. 6 and 7 of the '050 Patent, FIG. 6 of the '050 Patent being reproduced herein as FIG. 2. The features are fully described in the '050 Patent, wherein 150 is a first face of diffuser ring 130, 152 is a second opposed face of diffuser ring 130, 154 is an inner circumferential wall of diffuser ring 130, 156 is an outer circumferential wall of diffuser ring 130, and 158 are apertures used to assemble the diffuser ring to mating parts to facilitate its movement. However, since the VGD mechanism of the '050 Patent is utilized for control of stall based on related noise and vibration, the configuration is acceptable for its intended purpose, but its use for other functions is restricted.

The improved variable geometry diffuser (VGD) mechanism of the present invention will now be described in detail with further reference to the drawings. The VGD mechanism of the present invention performs functions in addition to controlling rotating stall and thus requires a different configuration as well as a different control mechanism.

Figure 3:
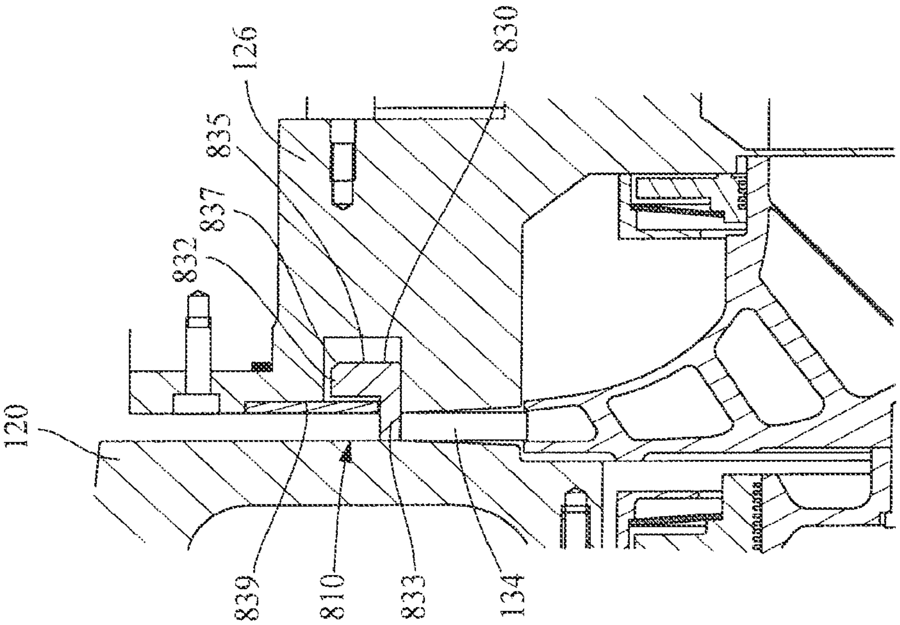
FIG. 3 is cross sectional view of the variable geometry diffuser of the present invention.
Figure 4:
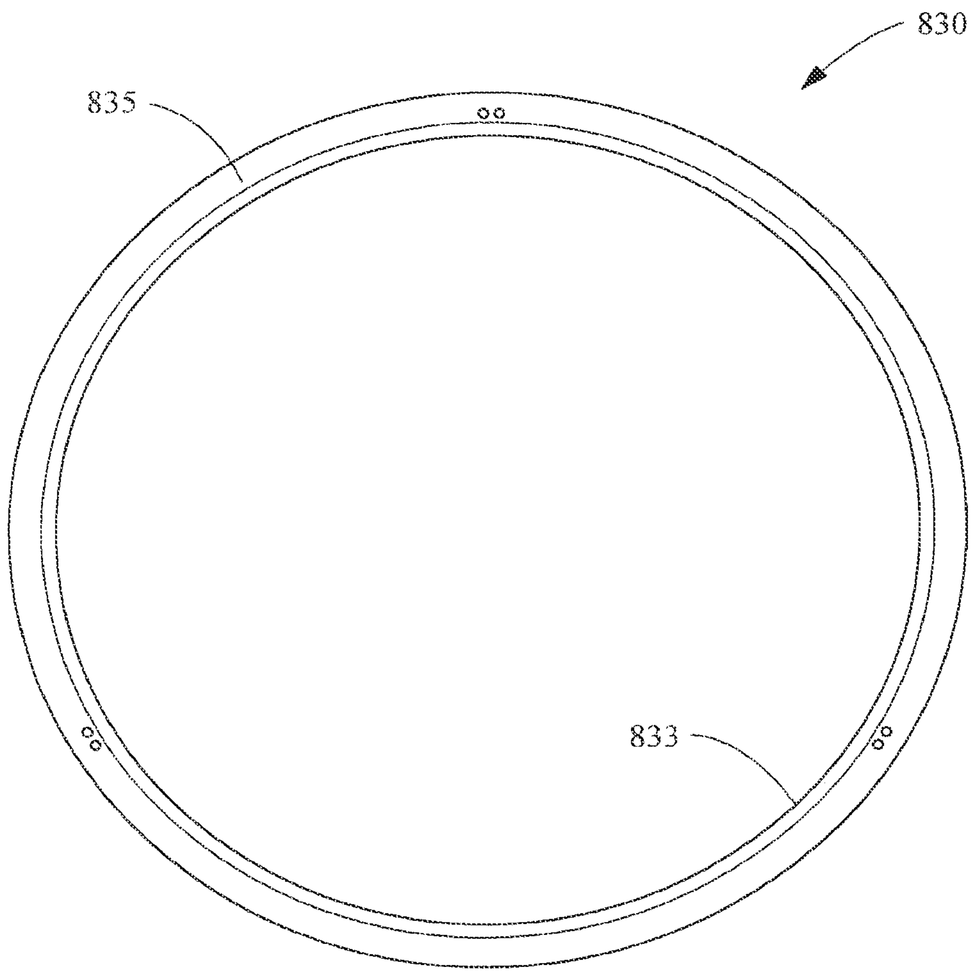
FIG. 4 is a top view of the diffuser ring of the present invention.

The VGD mechanism 810 of the present invention is set forth in FIG. 3. It has many similarities to the previous VGD mechanism; however, it also has significant differences, which differences may affect operation of the compressor. Diffuser ring 830 of the present invention has a different cross-sectional profile than prior art diffuser ring 130. Diffuser ring 130 is shown in perspective view in FIG. 2 and has a rectangular cross-section. By contrast, diffuser ring 830 of the present invention has an L-shaped cross-section as shown in the cross-section of FIG. 3 and in FIG. 4. Diffuser ring 830 includes a pair of substantially orthogonal flanges, a first flange 833 extendable into diffuser gap 134 and a second flange 835 substantially perpendicular to the first flange, the second flange 835 extending substantially parallel to the diffuser gap and the direction of gas flow. By substantially orthogonal flanges is meant flanges that extend within a range that includes 90°±15° to each other where orthogonal flanges extend 90° to each other. The second flange extending substantially parallel to the diffuser gap and the direction of the gas flow means that the orthogonal flanges extend within a range that includes 0°±15°, where 0° is parallel. When diffuser ring 830 is assembled into the compressor as an element of VGD mechanism 810, first flange 833 extends toward an opposed face of diffuser plate 120. It will be noted that first flange 833 provides diffuser ring 830 with the ability to extend further into diffuser gap 134 than prior art diffuser ring 130, as flange 833 provides an extended dimension in the axial direction, that is, into diffuser gap 134. The axial force on diffuser ring 830 is the result of the pressure differential across first flange 833. When diffuser ring 830 is fully retracted, the axial force is at its minimum since no pressure differential exists. However, when first flange 833 is extended into diffuser gap 134, high velocity gas passes over the face of first flange 833 of the ring creating a low pressure area. Higher pressure gas in the groove of nozzle base plate 126 applies a pressure to second flange 835. The force on ring 830 and on the mechanism that causes the ring to move into and out of diffuser gap 134 is the difference in gas pressure multiplied by the face area of diffuser flange 833, as previously discussed.

The axial force on ring 830 is reduced by reducing the overall radial thickness of first flange 833, which is the portion of diffuser ring 830 that extends into diffuser gap 134 when first flange 833 is extended, the radial thickness of first flange being perpendicular to the direction of gas flow in diffuser gap 134. Referring to FIG. 3 and diffuser ring 830, the area of first flange 833 that protrudes into diffuser gap 134 is reduced as compared to the design of prior art diffuser ring 130. The radial thickness of first flange 833 has been reduced by about ⅔, thereby reducing the load on diffuser ring proportionally, that is, by about ⅔, since load is proportional to the face area of first flange 833 within diffuser gap 134.

The reduction of the radial thickness of first flange 833 reduces available space to attach the actuating means that moves diffuser ring 830 from its retracted position to its extended position. Second flange 835 is provided to allow such attachment as shown in FIG. 3. Second flange 835 resides in groove 837 in nozzle base plate, second flange 835 moving in groove 837 allowing diffuser ring flange 833 to move into and out of diffuser gap 134. Groove 837 in nozzle base plate 126 is also required to permit assembly of diffuser ring 830 to the VGD mechanism. A large radial gap 832 around second flange 835 allows high pressure gas which enters groove 837 to equalize on either side of the second flange 835, thereby not contributing to the load associated with the gas pressure on diffuser ring 830. Thus, the overall pressure loading on the diffuser ring 830 is the pressure of the refrigerant acting on the area of the exposed portion of first flange 833 when extending into diffuser gap 134. A removable cover plate 839 is assembled to nozzle base plate 126 and is provided to facilitate assembly of the diffuser ring drive mechanism. Cover plate 839 provides a smooth, aerodynamic surface for flow of refrigerant gas as it flows to the compressor discharge, reducing the likelihood of turbulence in this area.

Figure 5:
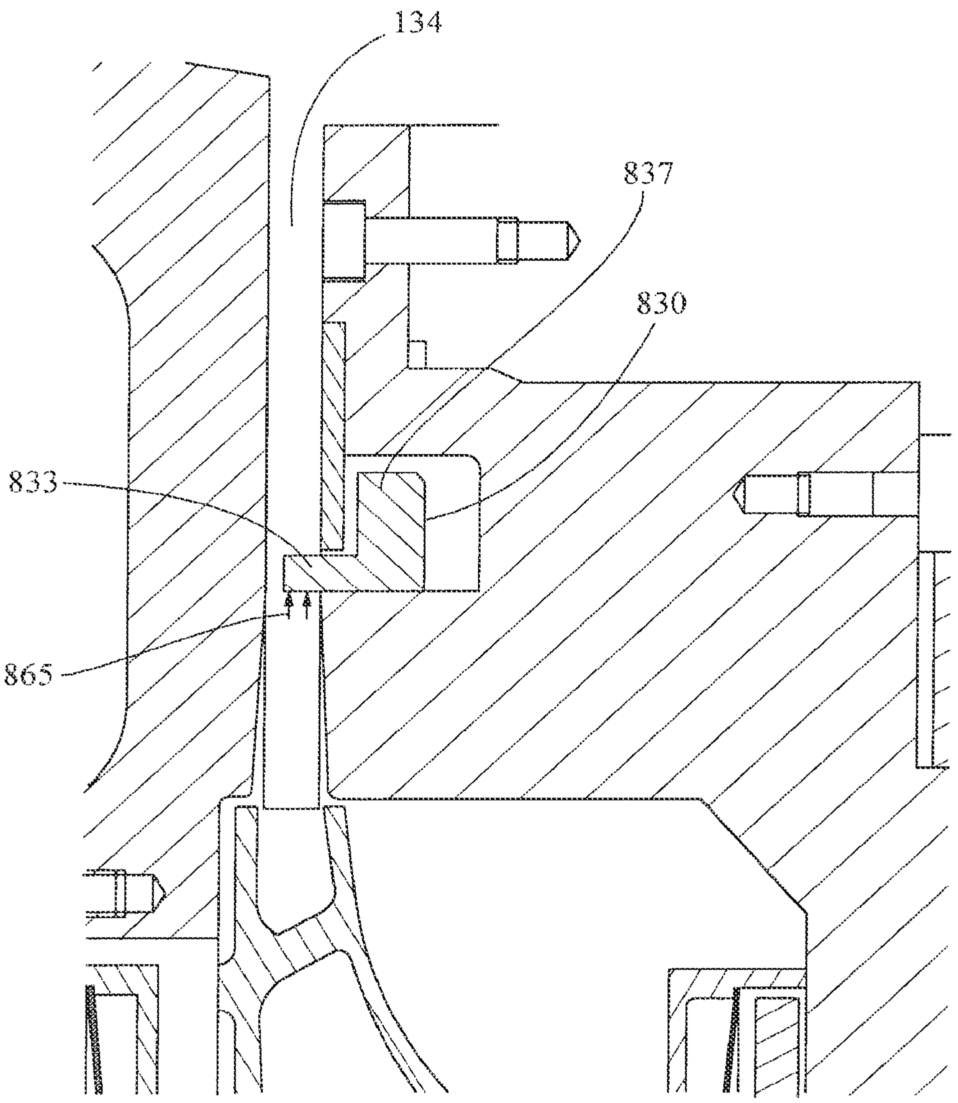
FIG. 5 is a cross sectional view showing load distributions on the diffuser ring of the present invention.

In forming flange 833, care must be taken to provide flange 833 with a preselected radial thickness. As depicted in FIG. 5, which shows a cross-section of diffuser ring 830 assembled to nozzle base plate 126, high pressure refrigerant impacts first flange 833 when diffuser ring 830 is extended into diffuser gap 134, as indicated by refrigerant flow 863. FIG. 5 indicates a radial pressure force on first flange 833. Another factor to be considered in determining the radial thickness of flange 833 is the fatigue life of diffuser ring 830 which is exposed to sizable pressure fluctuations. In addition, in the present invention, diffuser ring 830 must extend as closely as possible to diffuser plate 120 in order for the VGD mechanism to increase its capabilities for capacity control, improved turn down, surge control and minimization of compressor transient loads at start up and shut down. In order to reduce the gap as much as possible, diffuser plate 120 has carefully controlled dimensions and flange 833 must have carefully controlled tolerancing in terms of flatness of the face of flange 833 as well as the face of mating diffuser plate 120. If flange 833 is too thin, it may not be possible to maintain these geometric features within the desired tolerances, as mechanisms such as spring-back may occur which can adversely affect tolerances. Deviations from tolerances will increase leakage around flange and through the diffuser gap, and prevent the VGD mechanism from being used effectively for capacity control, turn down, transient control during start up and turn down and surge, even though the VGD mechanism may retain its ability for use in stall mitigation. As can be seen, diffuser ring 830, and in particular diffuser ring flange 833 ideally must have a flange thickness as small as possible to minimize the forces acting on it, but must have sufficient thickness to avoid spring back during fabrication and satisfy fatigue during operation while resisting the forces of gas pressure applied to it.

It is an important aspect to operation of this movable diffuser ring to maintain the geometric tolerances so as to minimize leakage around diffuser ring 830 and through diffuser gap 134 when diffuser ring 830 is fully extended. Compressors having higher refrigeration capacities may require additional increases to the flange thickness to accommodate higher pressure forces over wider diffuser widths to satisfy the competing design requirements cited above.

Other considerations also affect the overall design of the variable geometry diffuser mechanism of the present invention. Recent compressor designs utilize electromagnetic bearings rather than mechanical bearings commonly used in previous designs. Compressors utilizing electromagnetic bearings eschew the use of oil. However, some of the oil in compressors utilizing mechanical bearings assists in lubricating the actuator mechanism used to move diffuser ring 130 in prior art designs from a retracted position to an extended position in diffuser gap 134.

Figure 6:
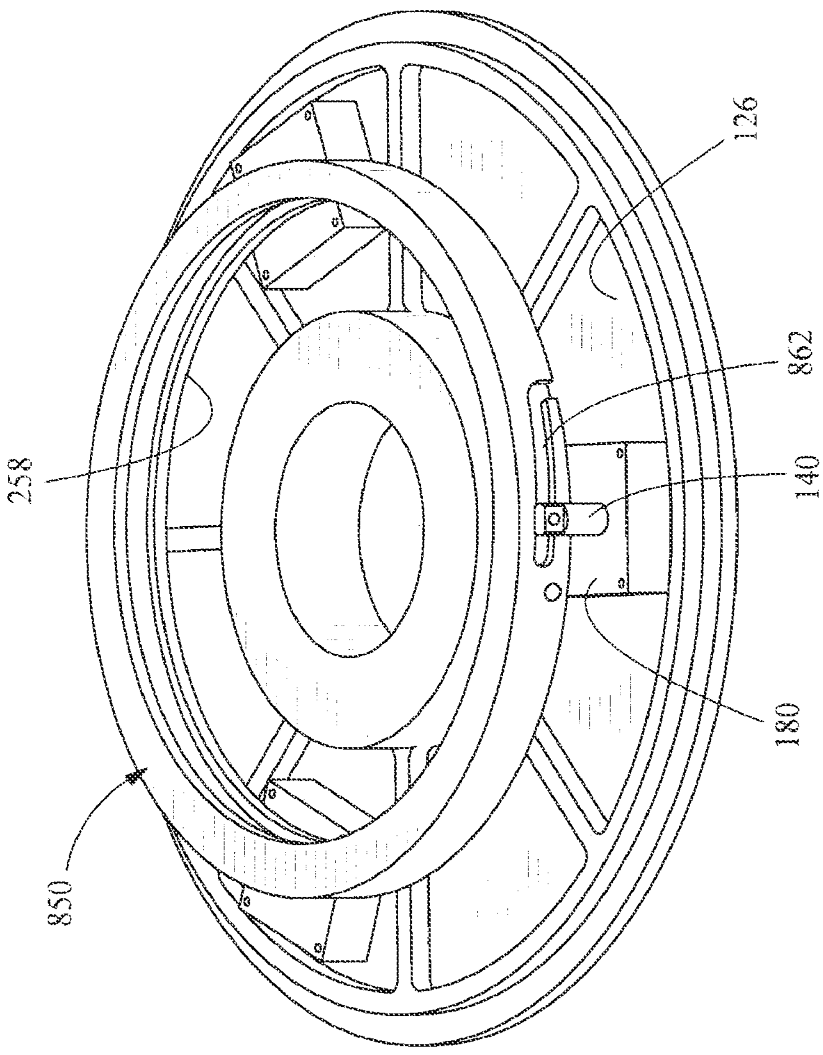
FIG. 6 generally depicts the drive ring operation of a variable geometry diffuser.

The variable geometry diffuser 810 of the present invention also utilizes an improved mechanism design that is operable in either a conventional centrifugal compressor that employs mechanical bearings with standard lubrication, or with centrifugal compressors utilizing electromagnetic bearings in a substantially lubrication-free environment. Generally, the mechanism that moves diffuser ring 830 is depicted in FIG. 6 and includes a drive pin 140 that travels in cam track 862. Drive pin 140 connects second flange 835 to drive ring 850 so that the rotational movement of drive ring 850 results in the translational motion of diffuser ring 830 from a reversible retracted position to a reversible extended position within diffuser gap 134. Drive ring 850 corresponds to drive ring 250 in FIG. 1. The arrangement of drive pin 140 to cam follower 200 in the variable geometry diffuser 810 of the present invention is also identical to the arrangement of prior art geometry diffuser 110, shown in FIG. 1. Cam follower 200 attached to drive pin 140 follows cam track 862 in drive ring 850 as drive pin 140 moves within cam track 862. Drive ring 850 of the present invention is identical to drive ring 250 of FIG. 1 except for important differences in cam track geometry 262 of drive ring 250, best shown in FIG. 9 and cam track geometry 862 of drive ring 850, shown in FIGS. 6 and 8. The attachment of drive ring 850 to diffuser ring 830 is identical to the attachment of drive ring 250 to diffuser ring 230, except for the points of connection of drive pin 140 to the respective diffuser rings 130 and 830. Diffuser ring 830 of the present invention has a flange shaped configuration and drive pin 140 connects to second flange 835 of diffuser ring 830. Of course, second flange 830 is not present in diffuser ring 130 as it is a simple cylindrical ring, as shown in cross-section in FIG. 1.

Figure 7:
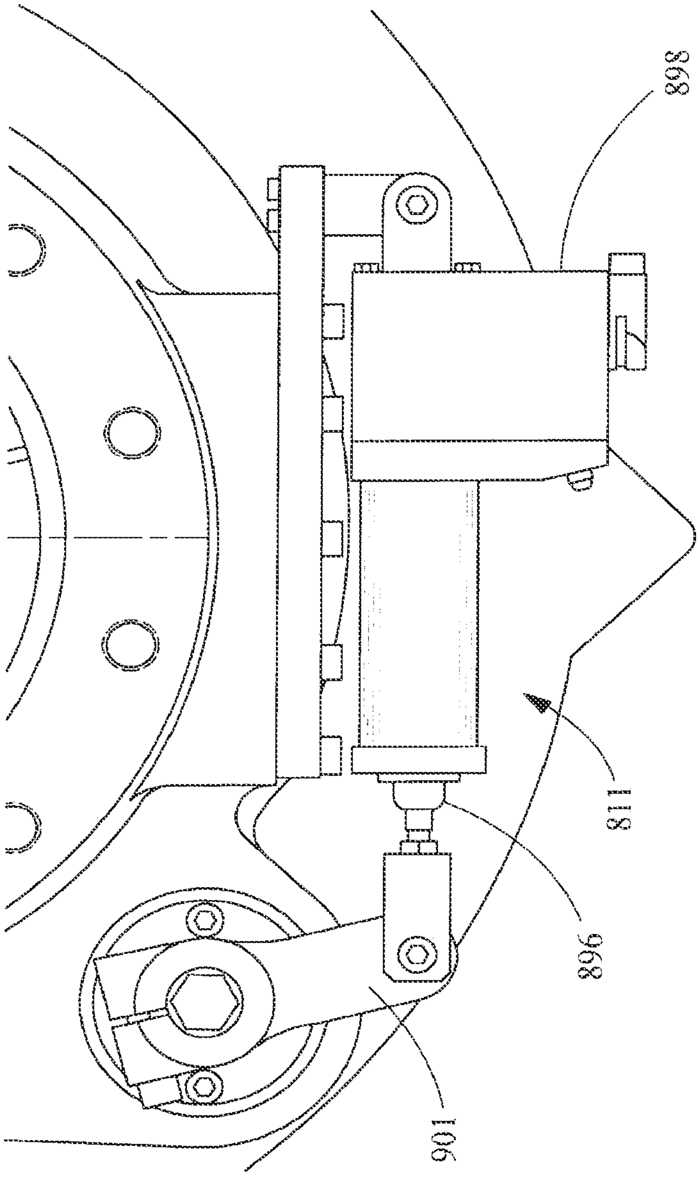
FIG. 7 depicts the arrangement of the linear actuator to the drive ring of the present invention.

Referring now to FIG. 7, an actuator 811 of the present invention operates in conjunction with a controller, so that its operation may be programmed.

Actuator 811 is a linear actuator and includes a drive rod 896 attached to a drive motor 898. Drive rod 896 is directly attached to the operating lever 901 attached to drive ring 850. Linear movement of drive rod 896 in turn rotates drive ring 850.

Figure 8:
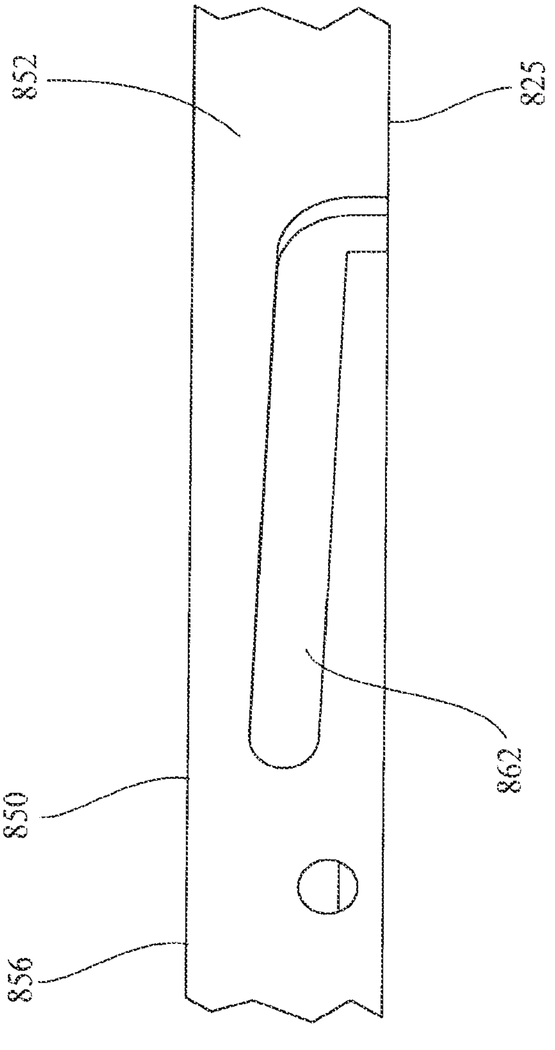
FIG. 8 depicts the cam track in the circumference of the drive ring of the present invention.
Figure 9:
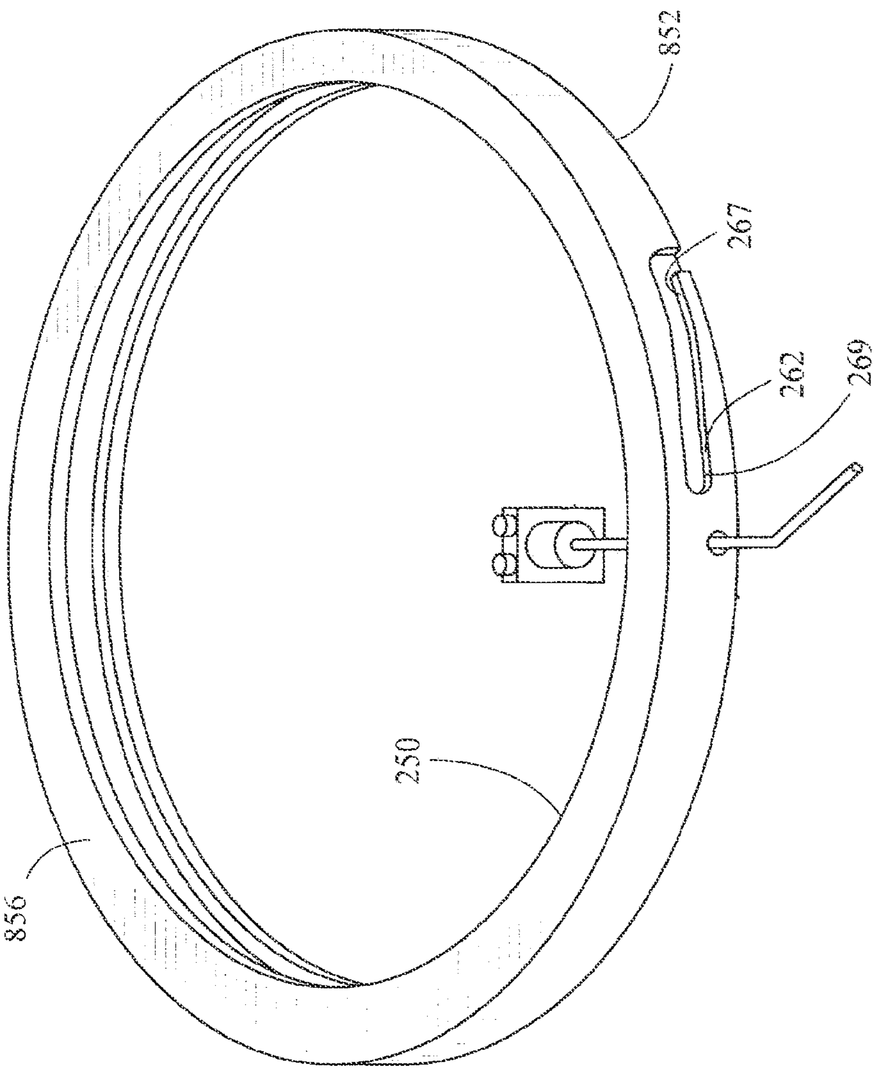
FIG. 9 Prior Art
FIG. 9 depicts the cam track in the circumference of the prior art drive ring.

Referring now to FIG. 8, cam tracks 862, located on the outer circumferential surface 852 of drive ring 850, have a preselected width and depth to accept cam follower 200. Generally, there are three cam tracks 862 located in circumferential surface 852 of drive ring 850, although only one is shown in FIG. 8. Cam tracks 862 extend from a bottom surface 825 of drive ring 850 toward a top surface 856 of drive ring 850, extending at an angle between these surfaces, and preferably in a substantially straight line. The shape of cam track 862 is now a ramp having a substantially preselected linear slope, as distinguished from the prior art cam tracks 262 shown in FIG. 9 having flats 267 and 269 at each end of the ramp. The flats in prior art cam tracks 262 account for inaccurate positioning and travel capabilities of the original damper motor and to accommodate adjustment of the mechanism at the fully retracted position. The flats prevent damage to the mechanism as the flats eliminate the possibility of jamming at either extreme of travel, and the inaccurate positioning was not a factor in the operation and capabilities of prior art cam tracks.

By contrast, actuator 811, in one embodiment a linear actuator, operating in conjunction with the linear cam tracks 862 to control drive ring 850, which in turn positions diffuser ring 830 in diffuser gap 134, provides faster action, variable speed, positional accuracy and precise feedback of the position of the location of first flange 833 in diffuser gap 134. The system of the present invention allows for ready calibration of diffuser ring 830 with respect to diffuser gap 134 at the extremes of diffuser ring 830, allowing diffuser ring 830 to be used for more than merely stall mitigation. Of course, the simplification of the connections between the levers and linkages of the actuator and the operating lever 901 attached to drive ring 250 provides further advantages.

During initial set up of VGD mechanism 810 of the present invention, or whenever a follow-up calibration is desired, the actuator simply operates to rotate drive ring 250, moving cam follower 200 from one end of travel in cam track 862 toward the opposite end of travel in cam track 862. Any actuator or motor that can accomplish this task may be used, although a device that moves cam follower 200 quickly in cam track 862 is preferred. While a rotary actuator is one variation that may be used, a linear actuator is preferred. The ends of travel at either end of cam track 862 correspond to the fully extended position of first flange 833 and fully retracted position of first flange 833. The maximum dimension of diffuser gap 134 at first flange 833, which is the distance between diffuser plate 120 to the outer surface of cover plate 839, is a known distance that can be determined or measured based on manufacturing and assembly. Programming functions of a controller include the ability to store and save the extreme positions of diffuser ring 830, the maximum dimension of diffuser gap 134 at first flange 833 and specifically first flange 833 with respect to diffuser plate 120, cover plate 839 and actuator 811 so that not only the extreme positions are known, but also the opening of diffuser gap 134 at any time (based on the position of first flange 833) so that the opening at diffuser gap 134 can be adjusted quickly based on changing operating conditions of compressor 100. The position of diffuser ring 830 at the extremes of travel can be calibrated, and the position of diffuser ring anywhere within these extremes can be determined without the use of additional sensors. A signal from the actuator may be used as part of the calibration procedure as well as to determine the position of diffuser ring 830 after calibration. Furthermore, if a question as the accuracy of the position of diffuser ring 830 should arise in the course of operation, recalibration can be accomplished as desired. The programming functions allow actuator 811 to operate and move diffuser ring 830 in a normal mode, the movements based on normal transients of compressor 100. However, actuator 811 also may operate in a rapid mode, which permits diffuser ring 830 to move to a fully extended position in which diffuser gap 134 is fully restricted as required if impending surge or stall is detected. As used herein, a fully restricted diffuser gap 134 is one in which diffuser ring 830 is fully extended so that the opening of diffuser gap 134 is at a minimum. While the design of VGD mechanism 810 does not provide a 100% gas seal when diffuser ring 830 is in the fully extended position, it does provide a substantial improvement over the prior art VGD mechanisms that provided only about a 75% reduction in diffuser gap 134 when diffuser ring 130 was in the fully extended position. The improvement of the present invention allows for leakage to be minimized to such an extent that it no longer impacts chiller control of turndown or start up and shut down surge. Thus, a fully restricted diffuser gap 134 and/or a fully extended diffuser ring 130 functionally is one that does not impact chiller control of turndown or start up and shut down surge.

The ability to rapidly position diffuser ring 830 by actuator 811 also allows for capacity control of the centrifugal compressor during normal operation. In addition, the ability to control the positioning of diffuser ring 830 so that the flow of refrigerant through diffuser gap 134 is limited permits for greater chiller turndown before the use of a hot refrigerant gas bypass is needed. Chiller turndown is defined as the minimum capacity that can be achieved by the compressor while still allowing for continuous operation without having to shut the compressor down. This is advantageous because hot gas bypass, or other similar means, is a highly inefficient means for achieving low compressor capacity because it requires artificially loading the compressor with refrigerant flow.

The rapid positioning of diffuser ring 830 by actuator 811 also allows for swift control of gas flow through diffuser gap 134 during shut down. The refrigeration cycle of a chiller requires mechanical work (compressor/motor) to create a refrigerant pressure rise and move refrigerant from evaporative conditions to condensing conditions. During normal "soft" shut downs, the compressor speed is reduced in a controlled manner to allow equalization of the pressure in evaporator and condenser shells, thereby eliminating large transient or upset conditions during shut downs. However, when the system requires for an immediate shut down, such as due to loss of electrical power to the motor (power interruption, faults, safeties, etc.), there are no means to maintain the high pressure in the condenser shell. The only mechanism for the system pressures to balance is through a back flow of refrigerant from the high pressure condenser to the low pressure evaporator through the compressor. With no electrical power to the compressor, the impeller undesirably behaves as a turbine with an energy transfer from the high pressure fluid in the condenser to the compressor as the refrigerant pressure equalizes, flowing to the low pressure (evaporator) side, spinning the compressor impeller backwards (opposite of design intent). In circumstances of loss of electrical power, battery backup to power actuator 811 may be provided to assure that VGD remains operational at shutdown. In addition, bearing loads can be at their highest levels during shutdown, if backspin, stall or surge occurs. The fast-acting closure of diffuser gap 134 by VGD mechanism 810 avoids bearing stability issues at shutdown. It also relieves a portion of these higher loads so lower load bearings can be used, which also translates into a cost savings because such bearings are less expensive. Closing diffuser gap 134 creates a resistance to back flow of refrigerant through compressor 100.

The rapid positioning of diffuser ring 830 by actuator 811 also allows for rapid control of gas flow through diffuser gap 134 during start up. During start up, there may already be a substantial load on the compressor if water pumps are already running with cold water flowing through the evaporator and warm water flowing through the condenser. In this case, a compressor can pass through stall and surge until it achieves sufficient speed to overcome the system pressure differences. Starting with a closed VGD can avoid transient surge under these conditions. Thus, prior to start-up, a controller may automatically instruct actuator 811 to move diffuser ring 830 to a fully extended position, closing diffuser gap 134. The controller may then instruct actuator 811 to retract diffuser ring 830, in accordance with a preprogrammed algorithm if desired, from its fully extended position based on a sensed condition, such as sensed pressure or compressor speed.

Much of the assembly of the variable geometry diffuser may remain unchanged from the previous design. However, in the present invention, the design is modified so that a precise position of diffuser ring 830 with respect to diffuser plate 120 is known at any time during normal compressor operation, allowing the precise opening of diffuser gap 134 to be known at any time. This is accomplished with a mechanism that does not require or utilize additional process lubrication. VGD mechanism 810 of the present invention, unlike prior art VGD mechanisms, preferably may be used in oil-free compressors such as those utilizing electromagnetic bearings. However, it also may be used in compressors that utilize oil-lubricated bearings.

The ability to precisely position diffuser ring 830 allows fine adjustments to be made to diffuser gap 134 during compressor operation based on compressor demand and/or output (i.e., chiller cooling load and pressure difference between the condenser and evaporator), and these fine adjustments can be programmed into the controller during a calibration procedure and stored in the controller. For example, as temperature changes in a conditioned space, diffuser gap 134 can be modified to correspond to the cooling demand on the chiller, the temperature changes corresponding to compressor demand. The demand on the compressor can be compared to actual compressor output. Thus, if demand is increased slightly, such as to cool the space slightly or to maintain the space at a temperature (as outside temperature increases) and if demand requires a slight increase in compressor output, diffuser gap 134 can be increased slightly. If demand is increased dramatically, such as by a demand to lower temperature in the space significantly, and there is a corresponding large increase required in compressor output, diffuser gap 134 can be fully opened to accommodate increased refrigerant flow. The position of diffuser ring 830, and hence the opening of diffuser gap 134 can be calibrated and the calibration results can be stored in the controller. Thus, when the compressor demand is 100%, diffuser gap 134 can be fully open as diffuser ring 830 is fully retracted. A fully retracted diffuser ring 830 occurs as diffuser ring flange 833 is fully retracted within groove 832. A fully extended diffuser ring 830 occurs as diffuser flange 833 is fully extended into diffuser gap 134, such as at compressor shut-down. These two conditions represent the extremes of compressor operation.

As noted, the controller can be programmed using the position of diffuser ring 830 at these extreme positions and a signal from the actuator that determines the position of diffuser ring 830 between these extreme positions. In addition, operating conditions can be correlated to the position of diffuser ring. Thus, the controller can be programmed to "learn" the position of diffuser ring 830 at, for example, a water temperature leaving the evaporator (cooling load). Other normally monitored and sensed conditions of the system can also be correlated to the position of diffuser ring 830, and the actuator. In addition, stall and surge preferably can be sensed using acoustic sensors, although sensing surge and stall is not limited to use of such acoustic sensors and other methods may be utilized for determining when surge and stall may be imminent. Of course, in the present invention, since the controller can determine the position of diffuser ring 830 at any time, this position can be used by the controller to move diffuser ring 830 based on refrigerant flow behavior, compressor efficiency and detection of surge or stall, the effect on any of these conditions not being linearly related to the position of diffuser ring 830.

For example, on start up, when compressor demand is throttled to 10%, diffuser gap 134 can be opened by moving diffuser ring 830 from the fully extended (closed) position to a first predetermined position. It should be noted that the movement of diffuser ring 830 will not always be the same for a 10% change in compressor demand, due to the non-linear effect of diffuser ring movement. Movement also depends on the initial and final positions of diffuser ring 830. Similarly, when compressor demand is required at 50% (an increase of 40% from the 10% demand above), diffuser gap 134 can be further opened by positioning diffuser ring 830 from the first predetermined position to a second predetermined position. In this way, an entire range of values can be stored in the controller, as required, to provide efficient operation of the compressor, and these values can be recalled (or further estimated) as compressor duty changes, and diffuser ring 830 can be repositioned quickly by the controller to achieve steady state operating conditions.

Once the occurrence of a detrimental event is detected, such as surge or stall detected by acoustic sensors, or loss of electric power to the system, the controller can override the programmed settings and quickly extend diffuser ring 830 into diffuser gap 134 to choke the flow of refrigerant through diffuser gap 134 until stall or surge is mitigated. Although surge or stall also may be detected by monitoring refrigerant flow through diffuser 810 with sensors, the preferred way of monitoring surge or stall is by use of acoustic sensors, as surge or stall generates significant and undesirable noise, the acoustic sensors communicating with the controller. Other methods for detecting surge and stall may utilize algorithms that detect surge or stall such as set forth in U.S. Pat. No. 7,356,999 entitled "System and Method for Stability Control in a Centrifugal Compressor" issued Apr. 15, 2008, U.S. Pat. No. 7,905,102 entitled "Control System" issued Mar. 15, 2011. U.S. Pat. No. 7,905,702 entitled "Method for Detecting Rotating Stall in a Compressor" issued Mar. 15, 2011 utilizes a pressure transducer downstream of the diffuser ring to detect and correct rotating stall. These patents are all assigned to the assignee of the present invention and are incorporated herein by reference. After surge or stall has been corrected, the programmed operation of the positioning of diffuser ring 830 based on compressor demand may be restored by the controller, as discussed above.

Advantages of the improved variable geometry diffuser mechanism 810 of the present invention include the use of a movable L-shaped flange 833 that reduces forces acting on the mechanism. This L-shaped flange also may be lighter in weight than movable flanges utilized in prior art variable geometry diffuser mechanisms. The reduced forces and reduced weight provide for a VGD that can react faster. It also allows the use of lighter weight and less expensive actuators. Further, the ability of the improved variable geometry diffuser to not only fully close, but also to be calibrated to control compressor operation based on sensed system conditions, allows the variable geometry diffuser to be used for capacity control as well as for surge and stall mitigation. This capacity control feature permits the elimination of pre-rotation vanes (PRV) which have been used in the past. Thus, although the improved variable geometry diffuser will be used more, the lower forces it will experience and its lighter weight will result in reduced wear with longer life, which in turn will provide increased reliability.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A variable geometry diffuser of a centrifugal compressor, comprising:

a nozzle base plate;

a diffuser ring disposed within a groove of the nozzle base plate and configured to extend into a diffuser gap formed between the nozzle base plate and a diffuser plate of the centrifugal compressor, wherein a radial gap extends between the nozzle base plate and a portion of the diffuser ring disposed within the groove to enable gas to flow from the diffuser gap into the groove and surround at least the portion of the diffuser ring; and an actuator configured to move the diffuser ring between a retracted position and an extended position to control an operating parameter of the centrifugal compressor without prerotation vanes in the centrifugal compressor, wherein the diffuser ring extends across the diffuser gap in the extended position to contact the diffuser plate and prevent flow of gas through the centrifugal compressor.

2. The variable geometry diffuser of claim 1, wherein, in the extended position of the diffuser ring, a first surface of the diffuser ring engages with a second surface of the diffuser plate.

3. The variable geometry diffuser of claim 1, wherein the diffuser ring comprises a first flange that is extendable into the diffuser gap and a second flange that extends cross-wise to the first flange.

4. The variable geometry diffuser of claim 3, wherein the second flange comprises a first surface, a second surface, and a radial surface extending between the first surface and the second surface, wherein the first flange extends from the first surface and is positioned radially inward of the radial surface with respect to a circumference of the diffuser ring.

5. The variable geometry diffuser of claim 3, wherein the portion of the diffuser ring comprises the second flange.

6. The variable geometry diffuser of claim 5, wherein the second flange comprises a first surface, a second surface, and a radial surface extending between the first surface and the second surface, wherein the first flange extends from the first surface, and wherein the portion of the diffuser ring comprises the first surface, the second surface, and the radial surface.

7. A centrifugal compressor, comprising:

a nozzle base plate;

a diffuser ring disposed within a groove of the nozzle base plate and configured to extend into a diffuser gap formed between the nozzle base plate and a diffuser plate of the centrifugal compressor, wherein a radial gap extends between the nozzle base plate and a portion of the diffuser ring disposed within the groove to enable gas flow from the diffuser gap into the groove;

an actuator configured to move the diffuser ring between a retracted position and an extended position to control an operating parameter of the centrifugal compressor without prerotation vanes in the centrifugal compressor, wherein the diffuser ring extends across the diffuser gap in the extended position to contact the diffuser plate and block back flow of gas through the centrifugal compressor; and a controller communicatively coupled to the actuator, wherein the controller is configured to instruct the actuator to transition the diffuser ring to the extended position in response to suspension of operation of the centrifugal compressor.

8. The centrifugal compressor of claim 7, wherein the controller is configured to instruct the actuator to transition the diffuser ring between the retracted position and the extended position based on sensor feedback indicative of the operating parameter of the centrifugal compressor.

9. The centrifugal compressor of claim 8, wherein the operating parameter comprises a speed of the centrifugal compressor or an acoustic energy generated by the centrifugal compressor.

10. The centrifugal compressor of claim 7, wherein the actuator is configured to provide a first signal to the controller indicative of a first position of the actuator corresponding to the diffuser ring in the extended position and to provide a second signal to the controller indicative of a second position of the actuator corresponding to the diffuser ring in the retracted position to enable calibration of the controller.

11. The centrifugal compressor of claim 10, wherein the controller is configured to determine a location of the diffuser ring relative to the diffuser gap when the actuator is between the first position and the second position based on the calibration of the controller and without use of additional sensors.

12. The centrifugal compressor of claim 7, wherein the controller is configured to instruct the actuator to transition the diffuser ring to the extended position upon receiving feedback indicative of a loss of electrical power supplied by a power source to the centrifugal compressor.

13. The centrifugal compressor of claim 7, wherein the controller is configured to determine an occurrence of surge or stall of the centrifugal compressor based on sensor feedback and to instruct the actuator to transition the diffuser ring to the extended position upon determination of the occurrence of surge or stall.

14. The centrifugal compressor of claim 7, wherein the controller is configured to store a distance between a first surface of the diffuser ring and a second surface of the diffuser plate, and the controller is configured to determine the extended position of the diffuser ring based on the distance.

15. The centrifugal compressor of claim 7, wherein the diffuser ring is formed by a first flange extending from the groove toward the diffuser gap and a second flange extending crosswise to the first flange.

16. The centrifugal compressor of claim 15, wherein a radial thickness of the first flange is less than a radial thickness of the second flange.

17. The variable geometry diffuser of claim 1, wherein the diffuser ring is configured to contact a mating surface of the diffuser plate in the extended position.

18. The centrifugal compressor of claim 7, wherein the diffuser ring is configured to contact a mating surface of the diffuser plate in the extended position.

19. A centrifugal compressor, comprising:

a nozzle base plate comprising a groove;

a diffuser ring disposed within the groove of the nozzle base plate, wherein the diffuser ring is configured to extend into a diffuser gap formed between the nozzle base plate and a diffuser plate of the centrifugal compressor, and a radial gap extends between the nozzle base plate and a portion of the diffuser ring disposed within the groove to enable gas to flow from the diffuser gap into the groove and surround the portion of the diffuser ring; and an actuator configured to move the diffuser ring between a retracted position and an extended position to control an operating parameter of the centrifugal compressor without prerotation vanes in the centrifugal compressor, wherein the diffuser ring extends across the diffuser gap in the extended position to contact the diffuser plate and prevent backflow of gas through the centrifugal compressor and prevent backspin of an impeller of the centrifugal compressor.

20. The centrifugal compressor of claim 19, wherein the diffuser ring comprises a first flange and a second flange, the first flange is extendable into the diffuser gap, and the second flange comprises the portion of the diffuser ring.

* * * * *